(12) United States Patent
Fryers et al.

(10) Patent No.: US 11,446,629 B2
(45) Date of Patent: Sep. 20, 2022

(54) BATCH PROCESSING APPARATUS

(71) Applicant: PROCESS TECHNOLOGY STRATEGIC CONSULTANCY LIMITED, Alloa (GB)

(72) Inventors: William Henry Fryers, Overseal (GB); Andrew Wills, Bogside (GB)

(73) Assignee: Process Technology Strategic Consultancy Limited

( * ) Notice: Subject to any disclaimer, the term of this patent is extended or adjusted under 35 U.S.C. 154(b) by 0 days.

(21) Appl. No.: 17/251,809

(22) PCT Filed: Jun. 12, 2019

(86) PCT No.: PCT/GB2019/051631
§ 371 (c)(1),
(2) Date: Dec. 13, 2020

(87) PCT Pub. No.: WO2019/239131
PCT Pub. Date: Dec. 19, 2019

(65) Prior Publication Data
US 2021/0113986 A1 Apr. 22, 2021

(30) Foreign Application Priority Data
Jun. 13, 2018 (GB) .................................... 1809679

(51) Int. Cl.
*B01J 19/00* (2006.01)
*B01J 19/18* (2006.01)

(52) U.S. Cl.
CPC ......... *B01J 19/0013* (2013.01); *B01J 19/006* (2013.01); *B01J 19/0073* (2013.01);
(Continued)

(58) Field of Classification Search
CPC .... B01J 19/00; B01J 19/0006; B01J 19/0013; B01J 19/0053; B01J 19/006;
(Continued)

(56) References Cited

U.S. PATENT DOCUMENTS 2,745,823 A * 5/1956 Hewitt ...................... C08F 2/00
526/88
7,749,464 B2 * 7/2010 Sakakura .............. F28D 9/0031
422/211
(Continued)

FOREIGN PATENT DOCUMENTS

CN 102575913 A 7/2012
CN 204395961 U 6/2015
(Continued)

OTHER PUBLICATIONS

Roundsari et al., Mixing Effect on Emulsion Polymerization in a Batch Reactor, Polymer Engineering and Science, 2015, 945-956 (Year: 2015).*
(Continued)

*Primary Examiner* — Natasha E Young
(74) *Attorney, Agent, or Firm* — Kern Kendrick, LLC; Thomas Y. Kendrick

(57) ABSTRACT

Current chemical batch processing technology is based on batch reactors, which typically consist of a vessel, in which reactants are processed. The batch reactor comprises a reactor vessel having at least one first thermal transfer element; a removable top cover for sealing the reactor vessel; a baffle component having at least one second thermal transfer element; and an agitator component, wherein each of the at least one first thermal transfer element and the at least one second thermal transfer element is independently controllable, and wherein the batch reactor comprises a thermal transfer surface-to-volume ratio of at least 6:1. This increases the thermal transfer potential and
(Continued)

the thermal energy transfer efficiency of the batch reactor, thereby to increase production speed and throughput.

13 Claims, 4 Drawing Sheets

(52) U.S. Cl.
CPC ...... *B01J 19/18* (2013.01); *B01J 2219/00029* (2013.01); *B01J 2219/00081* (2013.01); *B01J 2219/00768* (2013.01)

(58) Field of Classification Search
CPC .... B01J 19/0073; B01J 19/18; B01J 19/1812; B01J 2219/00; B01J 2219/00002; B01J 2219/00027; B01J 2219/00029; B01J 2219/00049; B01J 2219/00051; B01J 2219/00074; B01J 2219/00076; B01J 2219/00081; B01J 2219/00761; B01J 2219/00763; B01J 2219/00765; B01J 2219/00768; B01J 2219/00779; B01J 2219/32; B01J 2219/322; B01J 2219/32203; B01J 2219/3221; B01J 2219/32248; B01J 2219/32251; B01J 2219/32255; B01J 2219/32262; B01J 2219/32275; B01J 2219/32282

See application file for complete search history.

(56) References Cited

U.S. PATENT DOCUMENTS

| | | | |
|---|---|---|---|
| 2010/0113692 | A1 | 5/2010 | Mcguire et al. |
| 2011/0059523 | A1 | 3/2011 | Knight |
| 2013/0036713 | A1 | 2/2013 | Daute et al. |
| 2013/0089925 | A1 | 4/2013 | Damren et al. |
| 2016/0332132 | A1 | 11/2016 | Jung et al. |
| 2017/0074594 | A1* | 3/2017 | Wollants ............... F28D 9/0037 |

FOREIGN PATENT DOCUMENTS

| | | |
|---|---|---|
| CN | 105873675 A | 8/2016 |
| EP | 2465604 A1 | 6/2012 |
| WO | 98/57741 A2 | 12/1998 |
| WO | 01/78890 A2 | 10/2001 |
| WO | 2016/001791 A1 | 1/2016 |

OTHER PUBLICATIONS

Perry et al., Perry's Chemical Engineers' Handbook, Seventh Edition, 1997, 11-1 through 11-17 (Year: 1997).*
International Search Report and Written Opinion dated Oct. 2, 2019 in related PCT/GB2019/051631.
Search Report under Section 17(5) dated Jan. 25, 2019 in related GB App. No. 1809679.2.

* cited by examiner

BATCH PROCESSING APPARATUS

This application is a national stage application of International Application No. PCT/GB2019/051631, now WO 2019/239131 A1, filed on Jun. 12, 2019, which claims priority to Great Britain Patent Application No. GB1809679.2, filed on Jun. 13, 2018.

FIELD OF THE INVENTION

This invention relates to a batch processing apparatus and particularly, but not exclusively, to increasing productivity, energy efficiency and/or quality output of batch processing apparatuses.

BACKGROUND TO THE INVENTION

Current chemical batch processing technology is based on batch reactors, which typically consist of a vessel having a substantially standardised geometry and being made of one of two main materials; one of which being high alloys and the other being "glass-lined" steel. On the whole, batch reactor vessels have simple construction geometries which perform thermal energy transfer to and from the reactants within the vessel through the wall of the vessel.

The overall thermal transfer rate of a batch reactor is determined by a number of factors, including: thermal conductivity and surface fluid velocity of the heat transfer fluids; thermal conductivity and dimensions of the reactor vessel materials; and thermal conductivity and surface fluid velocity of process fluids. Whilst the properties of the fluids vary, the dominating factor to overall heat flux capability of the batch reactor is proportional to the size or area of the thermal transfer surface of the batch reactor that is in contact with the process fluids.

The inventors have realised the shortcomings of known apparatuses.

SUMMARY OF THE INVENTION

In accordance with a first aspect of the invention, there is provided a batch reactor, comprising
  a reactor vessel having at least one first thermal transfer element;
  a removable top cover for sealing the reactor vessel;
  a baffle component having at least one second thermal transfer element; and
  an agitator component,
  wherein each of the at least one first thermal transfer element and the at least one second thermal transfer element is independently controllable, and
  wherein the batch reactor comprises a thermal transfer surface-to-volume ratio of at least 6:1.
The baffle component may comprise:
  a cage element; and
  at least one baffle mounted on the cage element, the at least one baffle having at least one of the at least one second thermal transfer element.

The baffle component may be adapted so that the at least one baffle is radially separated from a central axis of the reactor vessel by a first distance, the first distance being equal to at least 80% of the reactor vessel radius.

The second thermal transfer element may comprise:
  at least one tubular element; and
  at least one plate component, the plate component being adapted to form an outside surface of the baffle.

The plate component may comprise dimpling. The plate component may comprise corrugation. The plate component may comprise one or more blades.

The plate component may be adapted to form a sealed surface of the second thermal transfer element, and
  may further comprise a thermal transfer material provided inside the plate component for exchanging energy between the tubular element and the plate component.

The tubular element may be comprised of a material having a thermal transfer coefficient of at least 12 W/m° K, optionally of at least 50 W/m° K, optionally of at least 100 W/m° K, optionally of at least 150 W/m° K optionally of at least 200 W/m° K, optionally of at least 250 W/m° K. The thermal transfer material may comprise a material having a thermal transfer coefficient of at least 12 W/m° K, optionally of at least 15 W/m° K, optionally of at least 50 W/m° K, optionally of at least 100 W/m° K, optionally of at least 150 W/m° K optionally of at least 200 W/m° K, optionally of at least 250 W/m° K.

The baffle component may further comprise a support component operable to removably mount the baffle component in the reactor vessel. This may be adapted to connect the reactor vessel and the top cover. The support component may be adapted to be connected to the removable top cover.

The reactor vessel may have a substantially cylindrical geometry with a length-to-diameter ratio of at least 1.8 to 1.

The batch reactor may be operable to simultaneously:
  provide a negative thermal flux to at least one of the at least one first thermal transfer element or at least one second thermal transfer element; and
  a positive thermal flux to at least one other of the at least one first thermal transfer element or at least one second thermal transfer element.

In accordance with a second aspect of the invention, there is provided a thermal transfer element for a batch reactor, comprising:
  a plate component adapted to form a sealed surface of the thermal transfer element;
  a tubular element; and
  a thermal transfer material provided inside the thermal transfer element for exchanging energy between the tubular element and the plate component.

The tubular element may be comprised of a material having a thermal transfer coefficient of at least 12 W/m° K, optionally of at least 15 W/m° K, optionally of at least 50 W/m° K, optionally of at least 100 W/m° K, optionally of at least 150 W/m° K optionally of at least 200 W/m° K, optionally of at least 250 W/m° K. The thermal transfer material may comprise a material having a thermal transfer coefficient of at least 12 W/m° K, optionally of at least 15 W/m° K, optionally of at least 50 W/m° K, optionally of at least 100 W/m° K, optionally of at least 150 W/m° K optionally of at least 200 W/m° K, optionally of at least 250 W/m° K.

The plate component may comprise dimpling. The plate component may comprise corrugation.

The thermal transfer element may be comprised in a baffle for use in a batch reactor.

BRIEF DESCRIPTION OF THE DRAWINGS

An embodiment of the invention will now be described, by way of example, with reference to the drawings, in which.

DESCRIPTION OF THE PREFERRED EMBODIMENTS

Batch processing is commonly performed using a suitably configured batch processing system comprising one or more batch reactors. Before describing the exemplary embodiments of the invention, it may be illustrative to describe a known exemplary batch processing system.

Figure 1:
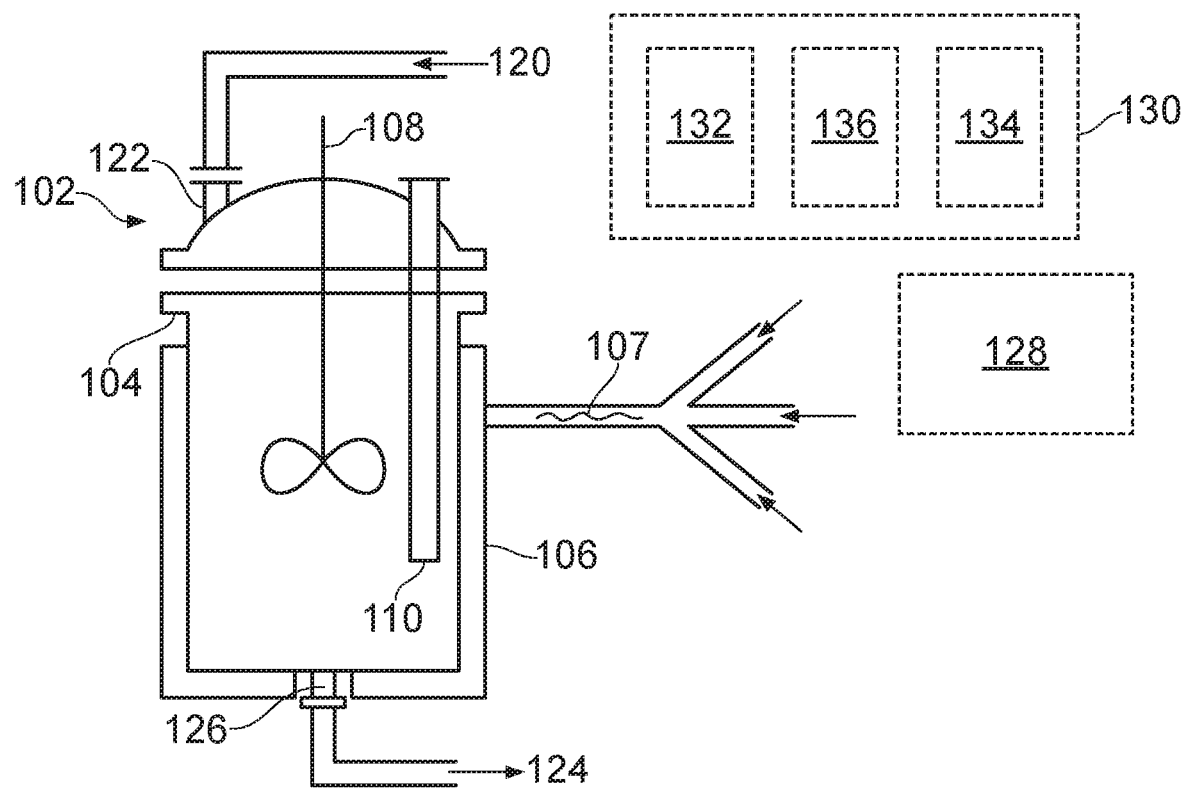
FIG. 1 shows schematically a known batch processing system.

An exemplary known batch processing system 100 will now be described with reference to FIG. 1. It will, of course, be appreciated that alternative processing systems, comprising alternative or additional components, to this exemplary batch processing system may easily be envisaged.

The known batch processing system comprises at least a first batch reactor 102 comprising a reactor vessel 104, a thermal transfer element 106 and a rotational agitator or agitator component 108. The reactor vessel may have any suitable or relevant dimensions. In some examples, the reactor vessel, as well as any related components, is dimensioned so as to conform to one of a set of standardised dimensions (e.g., DIN standard DIN 28136, DIN 28157 or DIN 28151). The batch reactor may in some examples comprise one or more baffles or baffle components 110 within the reactor vessel. The baffles may be fixed or attached in any suitable fashion, e.g., to the walls of the reactor vessel or to the top or head of the reactor vessel. Such baffles may, in conjunction with the rotational agitator, aid in ensuring that all reactants are mixed appropriately.

It will be appreciated that, for purposes of simplicity of explanation and conciseness, only a single batch reactor is shown in the present example. However, the batch processing system may, in principle, comprise any suitable or advantageous number of batch reactors. In fact, batch processing systems typically comprise a plurality of batch reactors for productivity and/or processing purposes.

The batch reactor 102 is connected to a number of components or subsystems that form part of the batch processing system 100. In the present example, one or more reactant delivery components 120 are connected to an input 122 of the batch reactor. The input may be situated in a suitable position. In some examples, the input is located substantially at the top of the batch reactor. Further, a reactant removal component 124 is connected to an output 126 of the batch reactor. The output may be situated in a suitable position. In some examples, the output is located substantially at the bottom of the batch reactor. This allows any reactants used during processing to be added to and removed from the batch processing system at relevant times.

The thermal transfer element 106 of the batch reactor is connected to a thermal transfer component 128, e.g. a heat exchanger. The thermal transfer component may be of any suitable type, e.g., a heat exchanger. This allows thermal energy to be transmitted to the reactants in the batch reactor or to be removed from the reactants in the batch reactor, depending on the requirements of the processes being carried out, by way of a thermal transfer medium 107. Any suitable thermal transfer medium may be used. In some examples, the thermal transfer medium is a fluid that is used to impart thermal flux to (positive thermal flux) or from (negative thermal flux) the reactor vessel and its contents. In some examples, a plurality of thermal transfer media is used, for example to meet different temperature requirements or to achieve specific temperature profiles. However, this may result in mixing of the various thermal transfer media, and may lead to cross contamination of media and/or corrosion within the batch processing system. Typically, a transfer medium may have a plurality of state phases and/or may be one of a plurality of solutions.

A typical processing cycle will involve at least one instance of heating the reactants to a first temperature, at least one instance of maintaining temperature at a substantially stable level, and at least one instance of cooling the reactants from the first temperature to a second lower temperature.

The known batch processing system 100 is described by way of example only. It will be appreciated that additional or alternative components may be comprised in the known batch processing system. Without limitation, known batch processing systems may comprise auxiliary or secondary systems 130, such as clean-in-place (CIP) components 132, pump or pressure components 134 or filtering components 136. Additionally, in some examples, the known batch processing system may comprise additional components based on the type and/or size of the batch reactor. For example, some batch reactors may, due to their size or shape, comprise more than one powered agitators. In other examples, some batch reactors may comprise elements or components in dependence on the types of reactants to be processed.

The inventors have realised that known batch processing systems have a number of drawbacks and disadvantages, some of which will now be discussed in detail.

Firstly, a large proportion of known batch processing systems utilise batch reactors having one of a set of standardised reactor vessel dimensions and/or features. Standardisation of reactor vessel dimensions and features is advantageous in respect of supply chains and manufacturing of reactor vessels, as well as for generic process design. However, given that standard vessel dimensions may not, typically, maximise the surface-to-volume ratio of the reactor vessel or otherwise increase the thermal conductivity of the system, vessels that conform to the standardised dimensions and/or features do not generally have an optimised thermal transfer potential. Accordingly, in known systems, overall processing potential is limited by this lack of optimization, which may negatively affect the operating profitability of the processing system.

Further, a typical operational cycle for a batch reactor used in a known batch processing system has at least one cooling and/or heating period during which the reactants transition from a first temperature to a second temperature. For example, the reactants may be cooled from a processing temperature to a temperature at which they can be safely removed from the batch reactor. The thermal energy transfer efficiency is subject to various factors, including but not limited to, the thermodynamic properties of the reactants, the properties of the reactor vessel, the number and size of the thermal exchange elements within the reactor, the properties of the cooling and/or heating medium and the properties of the external thermal exchange system. For these reasons, cooling and/or heating periods typically take up a large portion of the overall processing time, and may in some instances be a limiting factor in respect of production speed or throughput.

Further, in order to increase production volume, known processing systems typically increase the size of the reactor vessels, so as to allow a higher production volume. However, increased reactor vessel volume may reduce the thermal energy transfer efficiency of the system, in particular when using batch reactors having standardised dimensions and/or features as described above. In turn, this causes most processing systems to be operated well below theoretical and practical operating limits of the reaction chemistry, which reduces the productivity and profitability of the production system. Additionally, increased reactor vessel sizes may increase the potential for dangerous and/or catastrophic situations in the event of accidents or failures. This may be due to either or both of the volume of reactants present in a batch reactor, or to the storage requirements of a batch processing system due to the longer processing times. Additionally, smaller reactor vessels have inherently higher safety factors than larger reactor vessels Further, batch processing systems, like any other mechanical systems, periodically need to undergo maintenance, repairs or upgrades. Depending on the construction of the system and/or the individual batch reactors in the system, such procedures may require significant periods of downtime during which the system is not being used for production. Accordingly, lengthy repairs or maintenance periods negatively affect overall productivity.

Further, standardised batch reactor systems are typically designed for a specific volume output requirement. This may result in inefficiencies when such a system is used below that particular volume output, which is disadvantageous when the batch processing system is used to carry out multiple process and material configurations. In turn, this leads to the establishment of higher levels of duplication and/or variation during processing in order to meet anticipated requirements, which may, for example, lead to product quality considerations.

Further, reuse of thermal energy in known batch processing systems is typically limited. In known systems, a majority of the thermal energy added to the contents of a reactor vessel, as well as thermal energy added to the reactor vessel itself, during a heating phase is removed during the cooling phase without being reused or stored. Accordingly, in conventional batch processing systems, the majority of thermal energy added to the thermal transfer medium, or the reactants, is ultimately wasted, which is inefficient.

Further, it is common in batch processing systems to route thermal fluids through mixed fluid systems. This requires continual monitoring and chemical treatment of the fluids in order to maintain system performance, and or requires disposal of such fluids and/or any contaminants. In addition to potential environmental waste issues that such an approach causes, it is also expensive.

Further, it is known that many chemical reactions, which may be both exothermic and endothermic in nature, are controlled by means of the available thermal transfer rate. In known standard reactors, this control is achieved by the addition rate of one of the reactants. This enables a stable energy transfer balance to be maintained that is within the thermal transfer capabilities of the reactor, which e.g., avoids runaway reactions. Restrictions on the reactant addition rate is known to have deleterious effects on certain chemistry by creating non-uniformity of reactant constituents over time and can lead to unwanted transient reactions. This is particularly the case with crystallisation reactions, wherein uniformity of crystalline structures is desirable.

It will be appreciated that, for purposes of the present disclosure, the term thermal energy transfer is used to denote both "heating" and "cooling" processes, i.e., transferring thermal energy to an object or transferring thermal energy from an object respectively. Likewise, it will be appreciated that the term "thermal energy" is used to refer generally to an amount of thermal energy within a given entity, said amount of thermal energy being either greater or smaller than the amount of thermal energy of a second entity.

Figure 2:
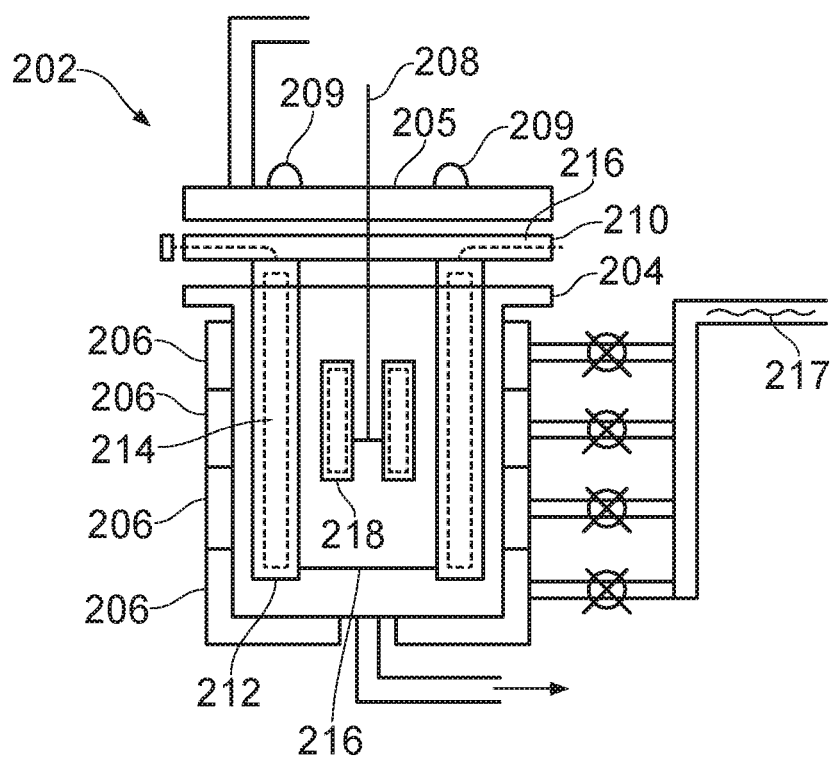
FIG. 2 illustrates a batch reactor in accordance with an aspect of the present invention.

An exemplary batch reactor in accordance with a first embodiment of the invention will now be discussed with reference to FIG. 2. For ease of comparison with FIG. 1, elements of FIG. 2 similar to corresponding elements of FIG. 1 are labelled with reference signs similar to those used in FIG. 1, but with prefix "2" instead of "1". Furthermore, for purposes of conciseness and clarity, only elements or features of the batch reactor which differ from those described in FIG. 1 are described in detail in the following.

The batch reactor 202 comprises: a reactor vessel 204 having a removable top cover 205 for sealing the reactor vessel, the reactor vessel comprising at least one first thermal transfer element 206; an agitator component 208 mounted inside the reactor vessel; and a baffle component 210 having at least one second thermal transfer element 214, wherein each of the at least one first thermal transfer element and the at least one second thermal transfer element is independently controllable, and wherein the batch reactor comprises a thermal transfer surface-to-volume ratio of at least 6:1. As will be described in more detail below, in some examples, the removable top cover 205 is additionally operable to affix or clamp the baffle component within the reactor vessel. Each of the thermal transfer elements is operable to transfer thermal energy between one or more reactants in the reactor vessel and a thermal energy store or thermal transfer point by way of a thermal transfer medium 207. In an example, the batch reactor is operable to simultaneously: provide a negative thermal flux to at least one of the at least one first thermal transfer element or at least one second thermal transfer element; and a positive thermal flux to at least one other of the at least one first thermal transfer element or at least one second thermal transfer element. This allows precise control and maintenance of temperatures within the reactants.

Any suitable thermal transfer medium 207 may be used. In some examples, the thermal transfer medium is substantially uniform and is operated in a single thermodynamic phase. In a specific example, the thermal transfer medium is kept in a single liquid phase. In an example the thermal transfer medium comprises an aqueous solution. In another example, the thermal transfer medium comprises an oil-based solution (e.g., a mineral oil). In some examples, the thermal transfer medium is selected based on a process temperature envelope required by the batch reactor or the process to be carried out.

For example, the lowest and highest temperature that the batch reactor is expected to operate at may in some instances be used to determine the type of thermal transfer medium that is most suitable. Any alternative or additional relevant or suitable parameters or properties of the thermal transfer medium may be considered, including (but not limited to): viscosity in the temperature range; thermal transfer coefficients of the medium in the temperature range; operating pressure; or the cost of the thermal transfer medium. Typical thermal transfer mediums includes: a mixture of water and ethylene glycol or a mixture of water and Propylene glycol for duties ranging from −25 degrees C. to +160 degrees C.; or Silicone based fluids for temperatures ranging from −100 degrees C. to +200 degrees C.

The reactor vessel may have any suitable shape. In some examples, the reactor vessel has a substantially cylindrical shape. However, the reactor vessel can, in principle, have any suitable geometric shape. In some examples, the exact shape of the reactor vessel is dependent upon one or more external factors, including but not limited to: spatial requirements or constraints; or constructional or manufacturing limitations. For simplicity purposes only, it will in the following be assumed that the reactor vessel has a substantially cylindrical shape. It is to be noted that this is not intended to be limiting and is purely for ease of discussion and explanation of the various concepts and features of the present disclosure.

The reactor vessel is dimensioned in a suitable fashion. In some examples, the has a pre-determined ratio between two of its primary dimensions (e.g., diameter and length in respect of a substantially cylindrical reactor vessel). In an example, the reactor vessel has a pre-determined length-to-diameter ratio. In specific examples, the reactor vessel has a length-to-diameter ratio of at least 1.5:1, 1.6:1, 1.7:1, 1.8:1, 1.9:1 or 2:1. By increasing the length-to-diameter ratio, the amount of thermal transfer surface per unit of volume is increased. This decreases the time it takes to heat up or cool down a given amount of material inside the reactor vessel due to the larger thermal transfer surface.

The reactor vessel 204 may have any suitable number of first thermal transfer elements 206. In an example, the reactor vessel has one first thermal transfer element. In another example, the reactor vessel has a plurality of first thermal transfer elements. The first thermal transfer elements may be controlled in a suitable fashion (e.g., by using a suitable thermal unit controller (not shown) that is operable to modulate the flow of the thermal transfer medium 207 to and from each of the at least one thermal transfer elements). In some examples, each first thermal transfer element is individually controllable. This enables thermal energy transfer between the reactants within the reactor and the thermal transfer elements to be controlled and maintained. For example, it is possible to reduce the effective thermal transfer area by reducing or stopping the flow of the thermal transfer medium to or from one or more of the at least one first thermal transfer elements. Typically, such a procedure may be initiated by stopping flow to or from the topmost first thermal transfer element, e.g., if the reactor is not completely full of reactants.

In another example, the batch reactor is used to perform heat-sensitive process heating and cooling. The higher surface area of the batch reactor, as well as the improved thermal transfer, when compared with a standardised batch reactor, enables the use of a lower thermal transfer medium temperature whilst maintaining an identical energy transfer to a standardised batch reactor. This type of operation is particularly advantageous during crystallisation reactions, e.g., when following metastable curves during crystal formation. Maintaining the process close to the curve envelope promotes improved crystal uniformity and yield.

The at least one first thermal transfer elements may be positioned or arranged in any suitable location or configuration in connection with the reactor vessel. In some examples, the at least one first thermal transfer element is integrated into the walls and/or bottom surface of the reactor vessel. In other examples, the at least one first thermal transfer element is separate to the reactor vessel but is adapted to or arranged to transfer energy to and from the reactor vessel. In a specific example, the first thermal transfer element comprises a tube component that is wrapped at least partially around the circumference of the reactor vessel. In a second specific example, the first thermal transfer element comprises a tubular component that is arranged in a spiral or coil arrangement around the circumference of the reactor vessel. In an example, the first thermal transfer elements are adapted to maintain a thermal transfer medium depth of less than 1.5% of the internal diameter of the batch reactor. In an example, the thermal transfer medium is injected into each of the first thermal transfer elements by a radial flow process operable to create a turbulent radial flow substantially around each first thermal transfer element. The turbulent flow increases thermal energy transfer between the thermal transfer medium and the thermal transfer element (and, by extension, the reactants within the batch reactor).

In some examples, the first thermal transfer element 206 is arranged so as to provide a thermal transfer surface that covers a predetermined portion of an interior surface of the reactor vessel 204. In an example, the first thermal transfer element provides a thermal transfer surface that covers more than 25% of the interior surface of the reactor vessel. In another example, the first thermal transfer element provides a thermal transfer surface that covers more than 50% of the interior surface of the reactor vessel. In an example, the first thermal transfer element provides a thermal transfer surface that covers more than 75% of the interior surface of the reactor vessel.

In examples, wherein the batch reactor comprises a plurality of first thermal transfer elements, the elements may be arranged in any suitable pattern or configuration. In an example, the plurality of first thermal transfer elements are arranged as circumferential elements that at least partially wrap around the circumference of the reactor vessel. Each of the said plurality of first thermal transfer elements are dimensioned so as to take up a predetermined portion of the overall length of the reactor vessel. In a particular example, the batch reactor comprises 5 first thermal transfer elements, each first thermal element being dimensioned in a length direction so as to take up 10% of the overall length of the reactor vessel. In another example, the batch reactor comprises at least one first thermal transfer elements, each first thermal element being dimensioned in a length direction so as to take up more than 10% and less than 35% of the overall length of the reactor vessel. In another particular example, each of the first thermal transfer elements are distributed circumferentially around the reactor vessel, each first thermal element taking up a predetermined percentage of the overall circumference of the reactor vessel.

In examples, wherein the batch reactor comprises a plurality of first thermal transfer elements, the elements may be arranged in any suitable pattern or configuration. In an example, the plurality of first thermal transfer elements are arranged as circumferential elements that at least partially wrap around the circumference of the reactor vessel. Each of the said plurality of first thermal transfer elements are dimensioned so as to take up a predetermined portion of the overall length of the reactor vessel. In a particular example, the batch reactor comprises 5 first thermal transfer elements, each first thermal element being dimensioned in a length direction so as to take up 10% of the overall length of the reactor vessel. In another example, the batch reactor comprises at least one first thermal transfer elements, each first thermal element being dimensioned in a length direction so as to take up more than 10% and less than 35% of the overall length of the reactor vessel. In another particular example, each of the first thermal transfer elements are distributed circumferentially around the reactor vessel, each first thermal element taking up a predetermined percentage of the overall circumference of the reactor vessel.

The removable top cover 205 may be formed in any suitable fashion and may comprise any suitable features. In some examples, the top cover is formed of a solid material. In other examples, the top cover is formed of a plurality of individual layers in a so-called "sandwich" construction. In an example, the "sandwich" construction comprises at least one layer of insulation material. This reduces the presence of colder zones within the batch reactor, thereby reducing the amount of condensation forming on inner surfaces of the top cover 205. Condensation is known to have deleterious effects with regard to corrosion in batch reactors, as well as depositing solid product build up due to vapour condensing to liquids and solids on the cooler surfaces of the reactor. Additionally, insulation reduces energy losses through the top cover to the environment, as well as improves the overall thermal transfer performance of the batch reactor. Internally located insulation is advantageous to that of external top cover insulation since it avoids known problems of water and product ingress into the insulation material, e.g., due to spillage or cleaning operations. Additionally, it helps reduce condensation occurring between the top cover 205 and any exterior insulation material, which is known to create top cover exterior corrosion and premature vessel failure.

In an example, the removable top cover 205 is formed so as to substantially seal the reactor vessel when mounted thereon. The top cover may form a seal with the reactor vessel in a suitable manner, e.g., by way of one or more O-rings 219. In examples wherein a plurality of O-rings are used, the O-rings may have the same diameter or each O-ring may have a unique diameter. In an example wherein the top cover comprises two O-rings, the top cover comprises means for controlling the pressure between the inner O-ring and the outer O-ring, e.g., to balance the pressure between the O-rings to the pressure inside the reactor vessel 204. By controlling the pressure between the O-rings, the risk of leakage (either egress of reactant or ingress of outside air or liquid into the reactor vessel) can be reduced. In an example, the pressure between the O-rings is controlled so as to be higher than the pressure inside the reactor vessel and higher than the ambient pressure outside the reactor vessel.

The baffle component 210 may have any suitable configuration or shape and may comprise any suitable number or configuration of individual baffles 212. It will be appreciated that the baffle component may comprise any suitable number of baffles. In an example, the baffle component comprises an even number of baffles. In another example, the baffle component comprises an odd number of baffles. In a specific example, the baffle component comprises four baffles.

Each of the individual baffles comprised in the baffle component may comprise any suitable number and configuration of features and/or components. In some examples, at least one of the baffles 212 comprises a second thermal transfer element 214. In some examples, at least one of the baffles comprises a plurality of second thermal transfer elements. In some examples, each one of the baffles comprised in the baffle component comprises a second thermal transfer element. In a specific example, the baffle component comprises four baffles, each of said baffles comprising a second thermal transfer element. Purely by way of example, a number of exemplary baffle configurations are described below in more detail.

The baffle component 210 may be positioned inside the batch reactor 202 in a suitable position and in a suitable fashion. In some examples, the baffle component comprises one or more baffles 212, each baffle being permanently or removably attached to the top cover 205. In an example, each of the baffles is welded to the top cover 205.

In some examples, such as the presently shown example, the baffle component 210 comprises a cage element 216 onto which the one or more baffles are mounted. The cage element provides support to the one or more baffles, and is formed or adapted so as to position the baffles in a desired or advantageous position or configuration inside the reactor vessel 204. Particularly, the cage element ensures that the individual baffles may be advantageously positioned relative to the agitator component, but without requiring that they are attached to or mounted on the outside walls of the reactor vessel 204.

The cage element may have any suitable structure and any suitable structural elements for supporting the baffles. In some examples, the cage element comprises a welded structure. The cage element may be comprised of elements made of any suitable material, or may be comprised of elements made of a plurality of materials. In some examples, the cage element 216 is made of substantially tubular and/or hollow elements. This enables pipes or tubes to be routed through the cage element in order to provide input and output flows of material (e.g., the thermal transfer medium) to the second thermal transfer elements, as will be described in more detail in the following. In specific examples, the cage element is covered wholly or partially in a corrosion resistant material. In some examples, the cage element may be wholly or partially insulated, e.g., by use of a solid insulation material or by use of vacuum insulation. It will be appreciated that, whilst discussed in respect of the cage element 216, the above-described input and output flow control could, in principle, equally well be implemented in examples wherein the baffles 212 are connected directly to the top cover 205 of the batch reactor 202.

The baffles 212 may be mounted in any suitable fashion and using a suitable attachment means or method. In some examples, the baffles are removably attached to the cage element. In other examples, the baffles are permanently attached to the cage element. In a specific example, the baffles are welded to the cage element.

The agitator component 208 is positioned inside the reactor vessel 204 and is operable to agitate or stir reactants inside the reactor vessel during processing. An exemplary implementation of the agitator component will now be described. It will, however, be appreciated that numerous implementations or various of the agitator described below may be envisaged within the scope of the present disclosure. In an example, the agitator comprises at least one third thermal transfer element 218 that provides an additional thermal transfer surface within the batch reactor 202. The third transfer element may be formed in any suitable fashion. In an example, the agitator component comprises a hollow shaft and a number of substantially hollow agitator blades. This allows supply and removal of thermal transfer medium so as to enable thermal transfer between the thermal transfer medium and the reactants in the reactor vessel by way of the agitator component.

As described above, the batch reactor 202 may comprise a number of individual thermal transfer elements (e.g., the first thermal transfer element(s), second thermal transfer element(s) or third thermal transfer element(s) discussed above). In some examples, the batch reactor and/or the one or more individual thermal transfer elements may be dimensioned or adapted so as to provide a predetermined thermal transfer surface-to-volume ratio. Typically, standardised reactor designs comprise a thermal transfer surface-to-volume ratio below 4.5:1 and in some instances as low as 1.6:1. As described above, the batch reactor 202 has a thermal transfer surface-to-volume ratio of at least 6:1. In some examples, the batch reactor has a thermal transfer surface-to-volume ratio of at least 7:1, 8:1 or 9:1.

The exemplary batch reactor described above has a number of advantages or benefits over known batch reactors. A number of these advantages are highlighted below.

A significant limitation on the effectiveness and productivity of a batch reactor is downtime, e.g., due to maintenance or repairs. For example, baffle components or other components mounted inside the reactor vessel may be difficult or inconvenient to maintain or repair as they are inside the vessel. However, by providing the top cover 205 with mounting elements 209 for mounting or attaching it to an external support structure, the time required for performing maintenance may be reduced.

Further, known batch reactors are typically constructed from corrosion-resistant materials (e.g., glass, enameled steel or alloys) since reactant solutions used in batch processing can be highly acidic or alkaline. The batch reactor 202 reduces corrosion effects for at least some of the following reasons.

1) The increase in the thermal energy transfer surface-to-volume ratio of the batch reactor reduces the time during which corrosion occurs. For example, during processing, corrosion is directly related to the time that the reactant solution is in contact with the interior surfaces of the batch reactor. By providing a greater relative thermal transfer surface, the processing time is reduced, thereby reducing the time available for corrosion to take place by at least 65%.

2) The greater the concentration of corrosive solution, the greater the corrosion that can occur on the surface of the vessel. Typically, the concentration of a reactant solution is diluted over time during reaction transformation. Increasing the reaction transformation speed therefore increases the rate of concentration reduction in the reactant solution, and in turn reduces the rate of corrosion on the interior surfaces of the batch reactor.

3) The greater the temperature of corrosive solution, the greater the corrosion that can occur on the surface of the vessel. By reducing the time required for heating and cooling a reactant solution, e.g., by increasing the temperature gradient during heating and cooling stages, as well as increasing the reaction rate, the time during which the batch reactor is subjected to corrosive reactant solutions at a high temperature is reduced, thereby reducing the level of corrosion.

Figure 3:
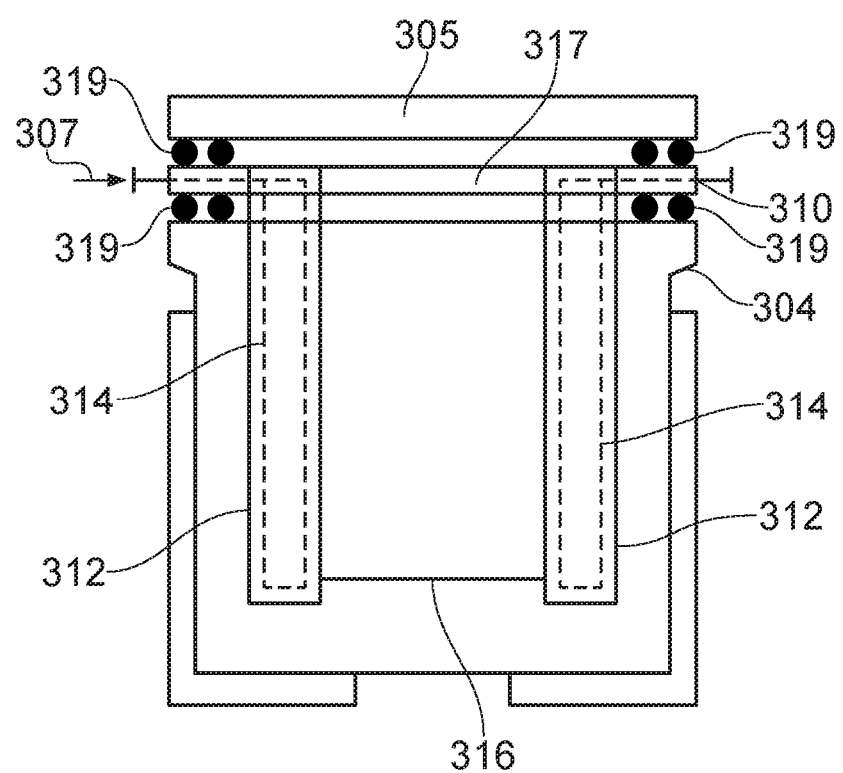
FIG. 3 shows a baffle component in accordance with an aspect of the invention for use in a batch reactor.

An exemplary baffle component 310 in accordance with the present disclosure will now be discussed with reference to FIG. 3. For ease of comparison with preceding Figures, elements of FIG. 3 similar to corresponding elements of the preceding Figures are labelled with reference signs similar to those used in these Figures, but with prefix "2". Furthermore, for purposes of conciseness and clarity, only elements or features of the batch reactor which differ from those described in the preceding Figures are described in detail in the following.

Whilst typically used as part of the exemplary batch reactor described above, it will be appreciated that the baffle component may equally well be used in combination with a standardised batch reactor. For example, a standardised batch reactor may be retrofitted with the exemplary baffle component. This may be advantageous in situations where it is not possible or practical to remove and/or replace the reactor vessel or any of the supporting components or elements.

The baffle component 310 comprises: a plurality of baffles 312 (although, in principle, the baffle component could equally well comprise only a single baffle), each having a second thermal transfer element 314; and a cage element 316. The cage element is comprised of a number of individual elements that are mutually attached to form a structure to which the plurality of baffles are mounted. The cage element is arranged so as to be positioned within a reactor vessel 304 when mounted, in order to increase the thermal transfer surface available during processing. In some examples, the cage element is adapted so as to position the baffles in a beneficial or advantageous position. In an example, the cage element is adapted so that the at least one baffle is radially separated from a central axis of the reactor vessel by a first distance. This ensures that the central portion of the reactor vessel is kept free of obstructions or other objects that potentially impede the flow of reactants within the reactor vessel. Furthermore, it reduces the risk of hot or cold zones forming due to restrictions in reactant flow. Additionally, it may render cleaning of the inside of the batch reactor easier. Any suitable radial separation may be used and may be defined in any advantageous fashion. In an example, the at least one baffle is radially separated from the central axis of the reactor vessel by a distance equal to at least 50% of the reactor vessel radius. In another example, the first distance is equal to at least 60% of the reactor vessel radius. In another example, the first distance is equal to at least 70% of the reactor vessel radius. In another example, the first distance is equal to at least 80% of the reactor vessel radius. In another example, the first distance is equal to at least 90% of the reactor vessel radius.

The cage element may be constructed of any suitable material. In some examples, the material is chosen based on the potential processing to be carried out in the batch reactor. Material choices include, but are not limited to, alloys or composite materials. The cage element may comprise any suitable or advantageous arrangement of individual elements, said individual elements each having a suitable arrangement or being formed in an advantageous manner. In some examples, as described above, the individual elements are formed as hollow or tubular elements. In some examples, the hollow or tubular elements comprise insulation (e.g., by way of a solid insulation material or by way of a vacuum).

In an example, each of the individual elements are formed as tubular elements and are arranged so as to allow a thermal transfer medium 307 to be guided to and from each of the baffles 312. In a specific example, the baffle component 310 comprises a number of thermal transfer pipes 311, each being arranged to provide an input flow or an output flow of thermal transfer medium to or from one of the baffles. For example, if the baffle component comprises four individual baffles, the baffle component would comprise eight thermal transfer pipes. The pipes may be connected in any suitable fashion to a thermal transfer component (not shown) that provides or receives the thermal transfer medium. In some examples, the thermal transfer pipes are connected individually to the thermal transfer component. In some examples, the pipes are routed through part of the cage element (e.g., a mounting frame, such as is described below). In some examples, one or more of the thermal transfer pipes comprise features for static mixer elements to be mounted to a suitable surface (e.g., the inside surface of the thermal transfer pipe). Each of such static mixer elements may in some examples comprise disruptive flow-inducing profiles and/or features. When positioned inside a respective thermal transfer pipe, each of said static mixer elements is operable to create turbulent flow inside the thermal transfer pipe.

The cage element further comprises a mounting frame 317. The mounting frame is formed so as to be removably mountable or attachable to one or both of the reactor vessel 304 or the removable top cover 305 of the batch reactor. In this manner, the mounting frame enables the cage element (and by extension the baffle component) to be mounted within the reactor vessel in a suitable and/or advantageous position. In some examples, the mounting frame comprises a flange. In the illustrated example, the mounting frame comprises a flange arranged to be connected to both a top end of the reactor vessel and a lower surface of the removable top cover by way of a plurality of O-rings 319. The O-rings ensure that the batch reactor remains sealed during processing. The O-rings may be provided or arranged in a suitable manner. In the present example, the mounting frame comprises four O-rings, two of which being arranged to form a seal between the top cover and the mounting frame, and two of which being arranged to form a seal between the mounting frame and the reactor vessel. When compressed, the respective pairs of O-rings form a primary and a secondary seal, each of which being sufficient to maintain pressure inside the reactor. In some examples, an inert gas is introduced into the space between the O-rings of each respective pair. In other examples, a vacuum is introduced into the space between the O-rings of each respective pair. In some examples, one or more of the removable top cover, the mounting frame or the reactor vessel additionally comprises a locking mechanism that allows one or more of these elements to be selectively locked together.

If maintenance or repair of the baffle component is required, the removable top cover may be removed and the baffle component subsequently lifted out of the reactor vessel. Alternatively, in some situations, the top cover may remain fixed and the reactor vessel and baffle component may be removed without disassembly of the top cover or any connections thereto. This obviates the need for carrying out such maintenance or repairs in situ, which may reduce the cost and increase the speed of such maintenance. Further, since the technician or operator is not required to carry out repairs or maintenance inside the batch reactor, which may be potentially dangerous for a human being, the risk of injury to the technician is reduced.

It will be appreciated that, whilst a particular implementation of an exemplary removable baffle component has been described above, a number of specific implementations of the removable baffle component may be envisaged within the scope of the present disclosure.

It will further be appreciated that, whilst typically employed or utilised as part of an exemplary batch reactor (such as is described with reference to FIG. 2 above), the baffle component described above may equally well be employed or utilised in connection with a standardised batch reactor or processing system (such as is described with reference to FIG. 1 above).

Figure 4:
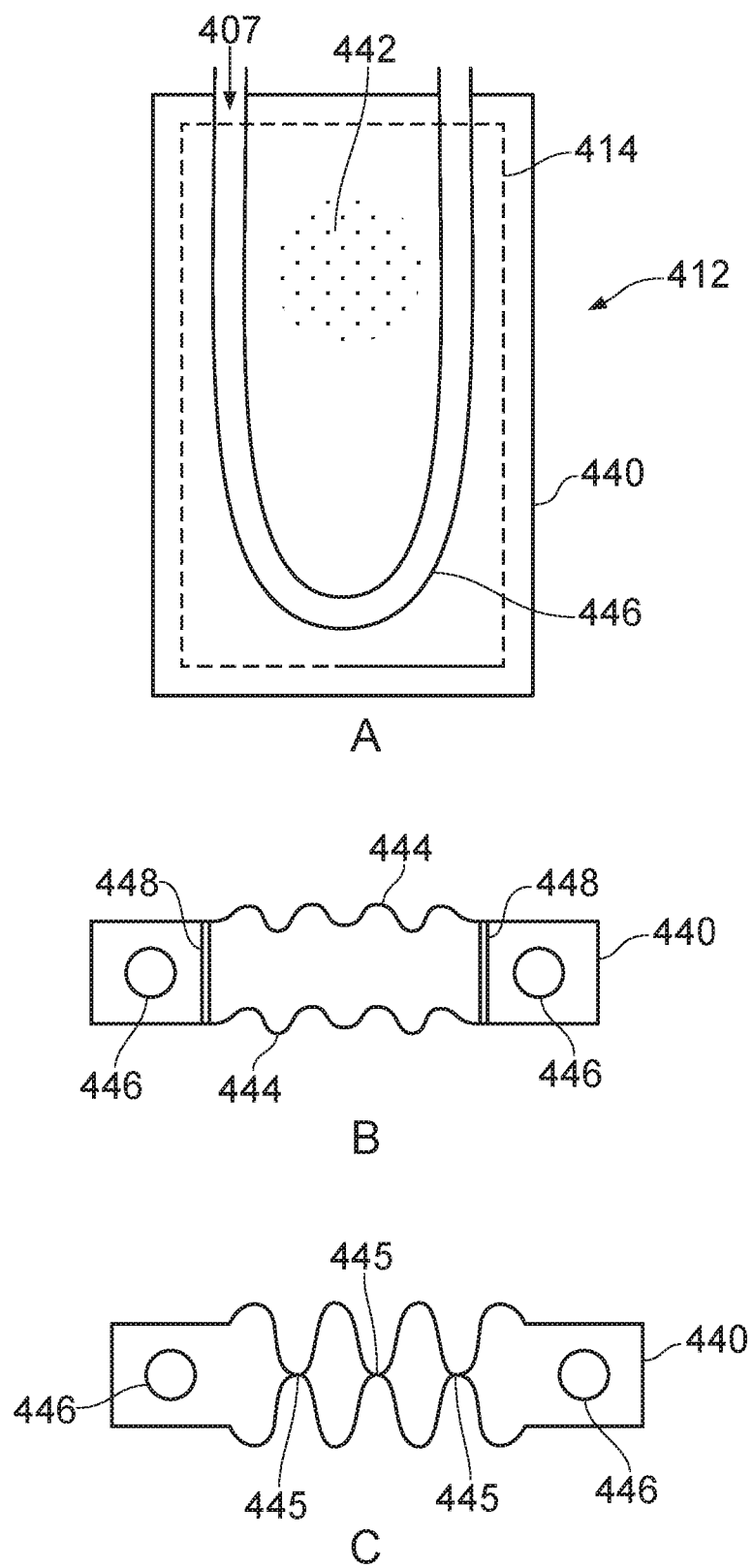
FIG. 4 shows a first exemplary baffle in accordance with an aspect of the invention.

An exemplary baffle 412, such as may be used in the batch reactor or baffle component described above with reference to FIG. 2 or FIG. 3 will now be described with reference to FIGS. 4A to 4C. It will be appreciated that this is purely for exemplary purposes and that variations of the implementation described below may be envisaged within the scope of the present disclosure. For ease of comparison with FIG. 2, elements of FIG. 4 similar to corresponding elements of FIG. 2 are labelled with reference signs similar to those used in FIG. 2, but with prefix "4" instead of "2".

In the present example, the baffle 412 comprises a second thermal transfer element 414. The second thermal transfer element may be arranged or formed in any suitable fashion.

In the present example, the second thermal transfer element substantially forms the entirety of the baffle, which maximises the thermal transfer surface on the baffle and avoids any unnecessary temperature differentials on the surface of the baffle. However, in principle, the second thermal transfer element could equally well form only a certain portion of the surface of the baffle or could be attached to the baffle. In the following, it will, for purposes of clarity and conciseness only, be assumed that the second thermal transfer element comprises substantially the entirety of the baffle. As a result, the terms baffle and second thermal transfer element may be used interchangeably for purposes of the present example.

The second thermal transfer element 414 comprises a plate component 440 that is adapted or shaped so as to form an outside surface of the baffle. The plate component is may be made of any suitable material (or plurality of materials), and may be formed in any suitable fashion. In some examples, the plate component is formed from a single sheet of material (or plurality of materials) that is shaped to form the surface of the thermal transfer element. In an example, the plate component is formed from a single sheet of composite material. In some examples, the plate component is formed of a plurality of sheets of materials mutually conjoined to form the surface of the thermal transfer element.

In an example, the plate component is adapted to create a sealed internal volume within the baffle 412. The sealed internal volume is, in a specific example, filled wholly or partially with a thermal exchange material 442. Such an example is described in more detail below.

The plate component may comprise one or more additional surface features 444, profiles or surface topographies or variations (in the following collectively referred to as "additional features" purely for purposes of conciseness). For example, the plate component may, in some examples, be profiled as part of the manufacturing or forming process. It will be appreciated that the additional features may comprise any number of geometric shapes, configurations or arrangements. In some examples, the additional features have cross-sectional geometries that include (without limitation): circular, oval, square, triangular or "V"-shaped. For example, the plate component may comprise dimpling. In another example, the plate component comprises corrugation. In yet another example, the plate component comprises dimpling and corrugation. In a further example, the plate component comprises vanes.

The additional features 444 may be positioned so as to be located on the outside surface and/or on the inside surface of the baffle 412 when the plate component is installed. The additional features may result in a number of benefits or advantages, in dependence on the specific implementation. For example, features (e.g., dimpling, corrugation or one or more blades) located on the outside surface of the baffle may increase the surface area of the baffle, thereby increasing the effective thermal transfer surface of the baffle. This may improve the efficiency of the thermal transfer. Furthermore, such features may create a turbulent fluid flow on the outside surface of the baffle, which further increases the efficiency of the thermal transfer. Yet further, the additional features (e.g., corrugation) may increase the structural rigidity and/or strength of the plate component, which may increase the overall rigidity and/or strength of the baffle. This may allow the baffle to be used at higher pressures or it may allow the material thickness of the plate component to be reduced, which may increase the efficiency of thermal transfer.

The thermal transfer element 414 comprises a tubular element (e.g., a pipe or tube) 446 operable to conduct a thermal transfer medium 407 to and from the second thermal transfer element. The tubular element may be comprised of any suitable material and may have any suitable cross section. In an example, the tubular element is a tube having a substantially circular cross section and made of a thermally conducting material (e.g., copper or a copper-based alloy). The tubular element may be arranged in any suitable or advantageous fashion within or without the baffle 412. In the present example, the tubular element is substantially arranged in a "U" shape within the internal volume of the baffle.

In some examples, the baffle may comprise additional features or components, in addition to those described above. In some examples, one or more of these additional features are arranged in combination with, or as part of, some of the features described above.

In an example, the baffle 412 comprises one or more structural components 448. Such structural components or "stiffeners" may improve the rigidity and/or torsional strength of the baffle, which may be advantageous in some circumstances. If, for example, it is envisaged to use the batch reactor to process substances with a high density or viscosity, it may be necessary to strengthen the baffles to ensure that the baffles are not damaged during processing. In an example, the one or more strengthening components are mounted on, or in conjunction with, the plate component. In another example, the one or more strengthening components are arranged so as to form part of the tubular component 446.

It will be appreciated that, although described as separate features above, in some examples, the additional features 444 and the structural components 448 may be the same features. One exemplary implementation of such a situation will now be described with specific reference to FIG. 4C. It will be appreciated that illustration is purely for exemplary purposes and that the skilled person may envisage additional or alternative implementations within the scope of the present disclosure. In this example, the plate component 440 comprises corrugations on opposing sides of the baffle 412. The corrugations are dimensioned so that the corrugations of the opposing surfaces of the plate component come into contact at a number of points 445. In a specific example, the corrugations may be mutually attached at the points 445, for example by way of welding, brazing or adhesives. The corrugations effectively act as an internal structure, which increases the strength and rigidity of the baffle. It will be appreciated that the corrugations are disclosed purely for exemplary purposes, and that additional features (e.g., dimpling or one or more blades) may additionally or alternatively be present.

Figure 5:
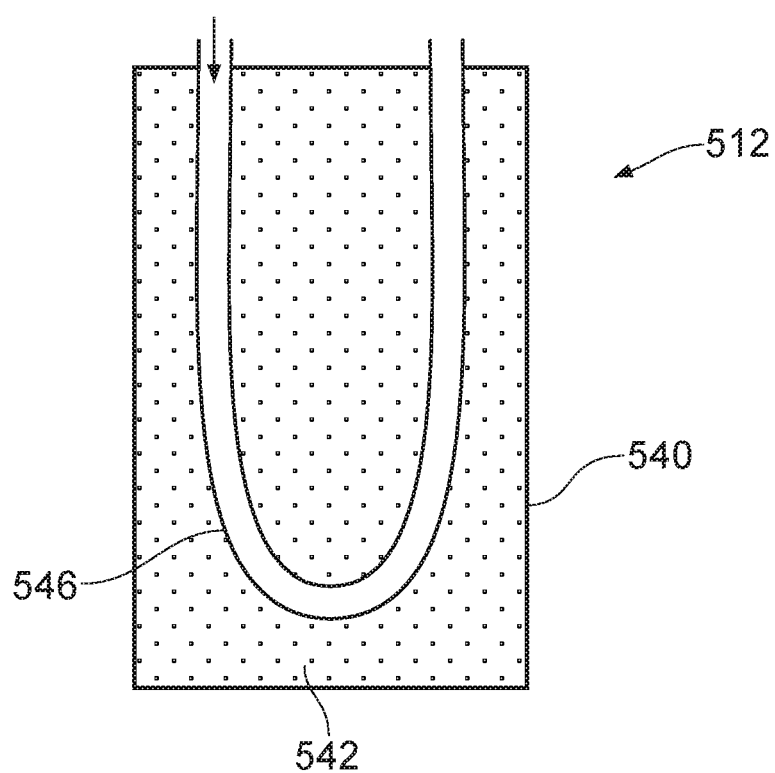
FIG. 5 shows a second exemplary baffle in accordance with an aspect of the invention.

A second exemplary baffle 512 such as may be used in the batch reactor, and in particular in connection with a baffle component described above with reference to FIG. 2 or FIG. 3, will now be described with reference to FIG. 5. It will be appreciated that this is purely for exemplary purposes and that variations of the implementation described below may be envisaged within the scope of the present disclosure. For ease of comparison with previous Figures, elements of FIG. 5 similar to corresponding elements of previous Figures are labelled with reference signs similar to those used in previous Figures, but with prefix "5".

Similarly to the example described with reference to FIG. 4 above, the baffle 512 comprises a plate component 540 adapted to form an outside surface of the baffle. In the present example, the plate component is adapted to form a sealed surface. The surface may be sealed in any suitable fashion, e.g., by welding, soldering, use of a bonding agent, or by using addition sealing elements made of a suitable material (e.g., rubber seals). It will be appreciated that numerous implementations of a sealed surface may be envisaged, some of which being dependent on one or more of the reactants to be processed in the batch reactor.

The tubular element 546, similarly to the example described above, is comprised of a suitable material. In an example, the tubular element 546 is comprised of a specific material or alloy (e.g., copper or a copper-based alloy). In another example, the tubular element is comprised of one or more materials having one or more properties with a pre-determined value. In specific examples, the tubular element is comprised of at least one material with a specific thermal transfer coefficient. In some examples, the thermal transfer coefficient is at least 8 W/m° K, optionally at least 12 W/m° K, optionally at least 15 W/m° K (e.g., if the tubular element is comprised of stainless steel), optionally at least 50 W/m° K, optionally at least 100 W/m° K, optionally at least 150 W/m° K, optionally at least 200 W/m° K, optionally at least 250 W/m° K, optionally at least 300 W/m° K, optionally at least 390 W/m° K (e.g., if the tubular element is comprised of copper), optionally at least 500 W/m° K, optionally at least 1000 W/m° K, optionally at least 1500 W/m° K, optionally at least 2000 W/m° K (e.g. if the tubular element is comprised of graphite).

Typically, the tubular element is comprised of at least one material with a thermal transfer coefficient of at least 250 W/m° K.

The plate component 540 and the tubular element 546 together form a sealed interior volume of the baffle 512. In the present example, the interior volume of the baffle is wholly or partially filled with a thermal exchange material 542. The thermal exchange material improves the thermal conductivity of the baffle, thereby facilitating thermal energy transfer between a thermal transfer medium 507 inside the tubular element 546 and the plate component 540. The thermal exchange material 542 may comprise any suitable number of materials, metals, non-metals, alloys or compositions. In some examples, the thermal exchange material comprises one or more materials having a thermal transfer coefficient having a specific value (e.g., as described above). In some examples, the thermal exchange material comprises one or more solid materials. In other examples, the thermal exchange material comprises one or more materials in a fluid state. In yet other examples, the thermal exchange material comprises a combination of solid materials and fluid materials. In an example, the thermal exchange material comprises a copper-based material or alloy. In another example, the thermal exchange material has one or more properties having a pre-determined value. In a specific example, the thermal exchange material is comprised of at least one material with a specific thermal transfer coefficient. In some examples, the thermal transfer coefficient is at least 8 W/m° K, optionally at least 12 W/m° K, optionally at least 15 W/m° K (e.g., if the thermal exchange material is comprised of stainless steel), optionally at least 50 W/m° K, optionally at least 100 W/m° K, optionally at least 150 W/m° K, optionally at least 200 W/m° K, optionally at least 250 W/m° K, optionally at least 300 W/m° K, optionally at least 390 W/m° K (e.g., if the thermal exchange material is comprised of copper), optionally at least 500 W/m° K, optionally at least 1000 W/m° K, optionally at least 1500 W/m° K, optionally at least 2000 W/m° K (e.g. if the thermal exchange material is comprised of graphite).

Typically, the thermal exchange material is comprised of at least one material with a thermal transfer coefficient of at least 250 W/m° K.

Use of a thermal exchange material may be advantageous for a number of reasons, including, but not limited to, those described in the following. It will be appreciated that the choice of specific thermal exchange material may be due to factors other than the thermal transfer properties described above. These include, without limitation: cost of the material, safety considerations (e.g., risk of explosion or contamination of the reactants or the outside environment), longevity of the material or other physical or chemical properties.

It improves the thermal energy exchange efficiency between the thermal transfer material and the reactants in the reactor vessel by increasing the effective thermal exchange surface. Additionally, this improvement enables the internal structure of the baffle to be simplified whilst maintaining a substantially similar performance to a baffle without a thermal transfer material. It is well known to increase effective thermal transfer area of a thermal transfer component (e.g., a baffle or a heat exchanger) by increasing the surface area of the tubular element which normally acts as a conduit for the thermal transfer medium. Typically, this is done by increasing the length of the tubular element and arranging it into a complicated pattern or structure.

Additionally, the thermal exchange material 542 increases the pressure resistance of the baffle when acting in conjunction with the plate component 540, and allows the material thickness of the plate component to be reduced, in turn increasing the thermal transfer efficiency and/or rate of the baffle.

Further, due to the improvement in the thermal energy exchange efficiency, the thermal response of the baffle (and by extension the batch reactor) is increased.

Further by the use of the thermal exchange material the vessel pressure and the thermal fluid pressure can be isolated from each other by an additional barrier thus increasing safety within the system and providing an opportunity to detect failure of either pressure system at a single barrier failure event.

The descriptions above are intended to be illustrative, not limiting. Thus, it will be apparent to one skilled in the art that modifications may be made to the invention as described without departing from the scope of the claims set out below.

The invention claimed is:

1. A batch reactor, comprising:
a reactor vessel having at least one first thermal transfer element;
a removable top cover for sealing the reactor vessel;
a baffle component having at least one second thermal transfer element;
wherein the baffle component comprises:
a cage element; and
at least one baffle mounted on the cage element, the at least one baffle having at least one of the at least one second thermal transfer element; and
an agitator component,
wherein each of the at least one first thermal transfer element and the at least one second thermal transfer element is independently controllable,
wherein the batch reactor comprises a thermal transfer surface-to-volume ratio of at least 6:1.

2. The batch reactor according to claim 1, wherein the baffle component is adapted so that the at least one baffle is radially separated from a central axis of the reactor vessel by a first distance, the first distance being equal to at least 80% of the reactor vessel radius.

3. The batch reactor according to claim 1, wherein the second thermal transfer element comprises:

at least one tubular element; and
at least one plate component, the plate component being adapted to form an outside surface of the baffle.

4. A batch reactor according to claim 3, wherein the plate component comprises at least one of: dimpling, corrugation, and one or more blades.

5. The batch reactor according to claim 3, wherein the plate component is adapted to form a sealed surface of the second thermal transfer element, and
further comprising a thermal exchange material provided inside the plate component for exchanging energy between the tubular element and the plate component.

6. The batch reactor according to claim 1, wherein the baffle component further comprises a support component operable to removably mount the baffle component in the reactor vessel.

7. The batch reactor according to claim 6, wherein the support component is adapted to connect the reactor vessel and the top cover.

8. The batch reactor according to claim 6, wherein the support component is adapted to be connected to the removable top cover.

9. The batch reactor according to claim 1, wherein the reactor vessel has a substantially cylindrical geometry with a length-to-diameter ratio of at least 1.8 to 1.

10. The batch reactor according to claim 1, wherein the batch reactor is operable to simultaneously:
provide a negative thermal flux to at least one of the at least one first thermal transfer element or at least one second thermal transfer element; and
a positive thermal flux to at least one other of the at least one first thermal transfer element or at least one second thermal transfer element.

11. A baffle component for a batch reactor comprising:
a cage element and
at least one baffle mounted on the cage element, the at least one baffle having at least one thermal transfer element, comprising:
a plate component adapted to form a sealed surface of the thermal transfer element;
a tubular element; and
a thermal exchange material provided inside the thermal transfer element for exchanging energy between the tubular element and the plate component.

12. A batch reactor according to claim 1, wherein the removable top cover is:
a. formed of a solid material; or
b. formed of a plurality of individual layers in a so-called "sandwich" construction, optionally wherein the "sandwich" construction comprises at least one layer of insulation material; or
c. formed so as to substantially seal the reactor vessel when mounted thereon, optionally forming a seal with the reactor vessel by way of one or more O-rings, optionally wherein the top cover comprises two O-rings, the top cover comprises means for controlling the pressure between an inner O-ring and an outer O-ring; or
d. is operable to affix or clamp the baffle component within the reactor vessel.

13. A batch reactor according to claim 1, wherein the cage element:
a. comprises a welded structure, optionally wherein the baffles are welded to the cage element, or is made of substantially tubular and/or hollow elements, optionally wherein the pipes or tubes are routed through the cage element; and/or
b. is covered wholly or partially in a corrosion resistant material; and/or
c. is wholly or partially insulated; and/or
d. has thermal transfer pipes routed through the cage element, wherein optionally one or more of the thermal transfer pipes comprise features for static mixer elements to be mounted to the inside surface of the thermal transfer pipes.

\* \* \* \* \*